US012601820B2

(12) United States Patent
Bailey

(10) Patent No.: US 12,601,820 B2
(45) Date of Patent: Apr. 14, 2026

(54) ADAPTIVE CONTRAST FOR SONAR IMAGES

(71) Applicant: Navico, Inc., Tulsa, OK (US)

(72) Inventor: Paul Robert Bailey, Auckland (NZ)

(73) Assignee: Navico, Inc., Tulsa, OK (US)

( * ) Notice: Subject to any disclaimer, the term of this patent is extended or adjusted under 35 U.S.C. 154(b) by 320 days.

(21) Appl. No.: 18/358,986

(22) Filed: Jul. 26, 2023

(65) Prior Publication Data

US 2025/0035763 A1     Jan. 30, 2025

(51) Int. Cl.
G01S 7/539 (2006.01)
G01S 15/89 (2006.01)

(52) U.S. Cl.
CPC .......... G01S 7/539 (2013.01); G01S 15/8902 (2013.01)

(58) Field of Classification Search
CPC .............................. G01S 15/8902; G01S 7/539
See application file for complete search history.

(56) References Cited

U.S. PATENT DOCUMENTS

| | | | |
|---|---|---|---|
| 8,300,499 B2 | 10/2012 | Coleman et al. | |
| 8,305,840 B2 | 11/2012 | Maguire | |
| 8,320,216 B2 * | 11/2012 | Jiang | G01S 7/53 |
| | | | 367/87 |
| 9,182,486 B2 * | 11/2015 | Brown | G01S 15/86 |
| 9,972,110 B2 | 5/2018 | Steward | |

| | | | |
|---|---|---|---|
| 2010/0226203 A1 * | 9/2010 | Buttle | B63B 21/66 |
| | | | 367/15 |
| 2010/0250122 A1 * | 9/2010 | Kubota | G01C 21/203 |
| | | | 701/408 |
| 2011/0007606 A1 * | 1/2011 | Curtis | G01S 15/04 |
| | | | 367/103 |
| 2011/0012773 A1 * | 1/2011 | Cunning | G01S 7/6245 |
| | | | 342/52 |
| 2011/0013484 A1 * | 1/2011 | Coleman | H04W 4/02 |
| | | | 367/88 |
| 2011/0128819 A1 * | 6/2011 | Jiang | G01S 7/53 |
| | | | 367/99 |
| 2012/0011437 A1 * | 1/2012 | James | G06F 3/04883 |
| | | | 715/702 |

(Continued)

*Primary Examiner* — Daniel L Murphy
*Assistant Examiner* — Amie M Ndure
(74) *Attorney, Agent, or Firm* — Nelson Mullins Riley & Scarborough LLP

(57) ABSTRACT

A system for the enhancement of sonar data is provided comprising one or more processors, a memory, and one or more sonar transducer assemblies configured to provide sonar data. The memory includes computer program code configured to, when executed, cause the processor(s) to receive the sonar data, with the sonar data providing information representative of an underwater environment around a watercraft. The computer program code is also configured to, when executed, cause the processor(s) to perform adaptive contrast image processing to adjust a brightness level or color of the sonar data at one or more locations and to form adjusted sonar data. Adaptive contrast image processing considers a distance of a location from a sonar transducer assembly of the one or more sonar transducer assemblies, a brightness level, color, water clarity, or depth associated with a location, an object type, or an orientation or surface properties of the object.

20 Claims, 8 Drawing Sheets

(56) References Cited

U.S. PATENT DOCUMENTS

| | | | | |
|---|---|---|---|---|
| 2012/0014220 | A1* | 1/2012 | DePasqua | G01S 7/52053 |
| | | | | 367/88 |
| 2013/0148471 | A1* | 6/2013 | Brown | G01S 15/86 |
| | | | | 367/88 |
| 2013/0208568 | A1* | 8/2013 | Coleman | G01S 7/521 |
| | | | | 367/88 |
| 2014/0010048 | A1* | 1/2014 | Proctor | G01S 15/102 |
| | | | | 367/88 |
| 2016/0061951 | A1* | 3/2016 | Brown | G01S 15/8902 |
| | | | | 367/7 |
| 2017/0242113 | A1* | 8/2017 | Lauenstein | G01S 7/6281 |
| 2022/0268927 | A1 | 8/2022 | Hooper | |

* cited by examiner

Receive Sonar Data
502

Perform Adaptive Contrast Image Processing to Form Adjusted Sonar Data
504

Form a Sonar Image Based on the Adjusted Sonar Data
506

Cause Display of the Sonar Image
508

500

Receive Sonar Data
602

Form a Sonar Image Based on the Sonar Data
604

Perform Adaptive Contrast Image Processing to Form Adjusted Sonar Data in the Form of an Adjusted Sonar Image
606

Cause Display of the Adjusted Sonar Image
608

600

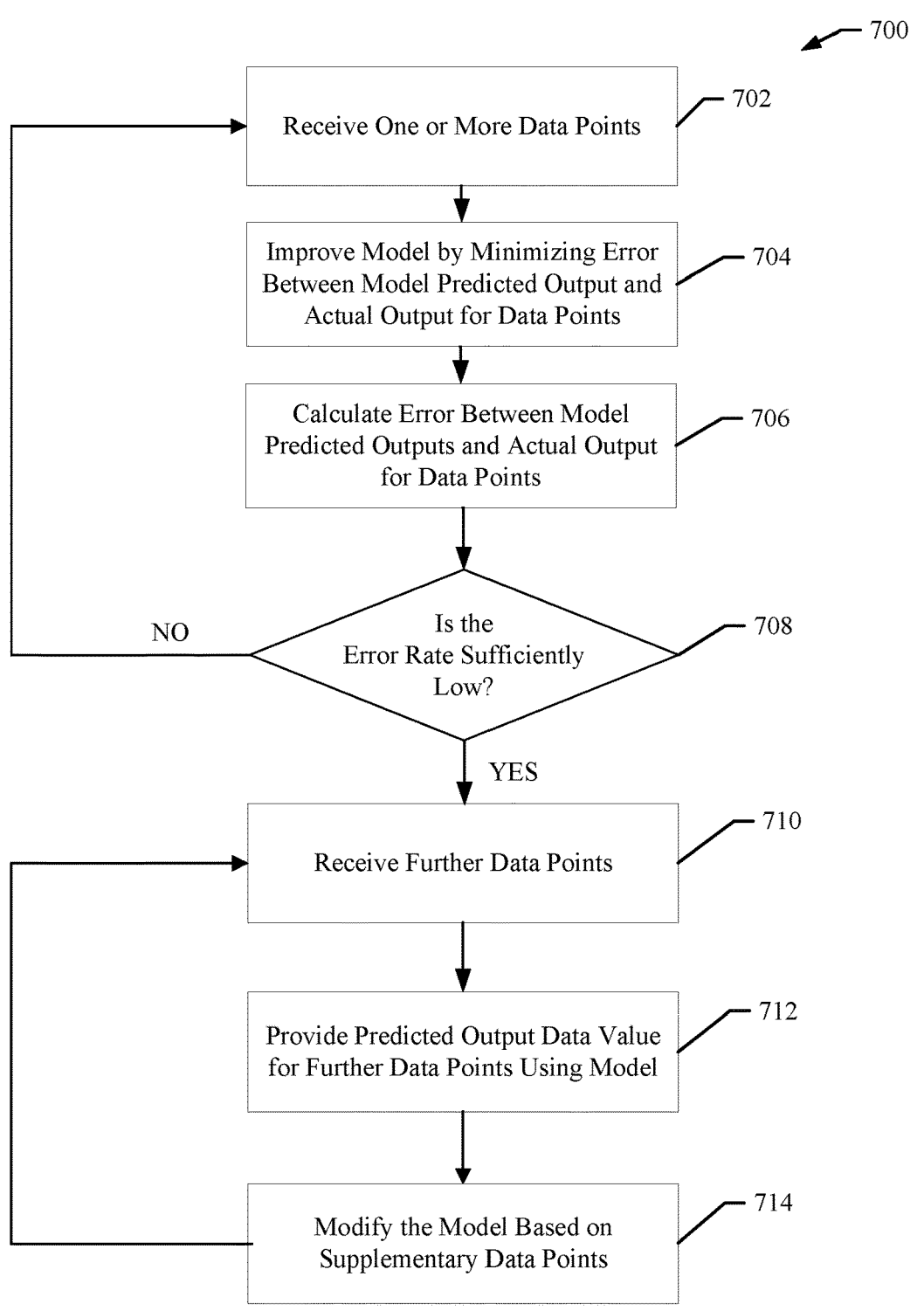

700

Receive One or More Data Points — 702

Improve Model by Minimizing Error Between Model Predicted Output and Actual Output for Data Points — 704

Calculate Error Between Model Predicted Outputs and Actual Output for Data Points — 706

Is the Error Rate Sufficiently Low? — 708

NO

YES

Receive Further Data Points — 710

Provide Predicted Output Data Value for Further Data Points Using Model — 712

Modify the Model Based on Supplementary Data Points — 714

*FIG. 7*

ADAPTIVE CONTRAST FOR SONAR IMAGES

FIELD

Embodiments relate generally to systems, methods, and computer program products that utilize adaptive contrast image processing techniques for sonar images.

BACKGROUND

Sonar data is commonly obtained from sonar transducer assemblies on a watercraft, and is commonly used to form sonar images. However, in these sonar images, some locations are often presented with low brightness and/or are difficult to discern in the sonar imagery. Alternatively, high brightness may cause potentially interesting objects or features to get washed out. Such common occurrences often makes the sonar images difficult to decipher and/or use for users, particularly, for novice users. Improvements in the foregoing are desired.

BRIEF SUMMARY

Adaptive contrast image processing techniques are utilized herein to create improved sonar images. The adaptive contrast image processing techniques may consider a variety of different factors to adjust a sonar image (or underlying sonar data) so that a resulting sonar image provides more desirable brightness and/or color levels. For example, the adaptive contrast image processing techniques may consider a distance of a location from a sonar transducer assembly, a brightness level or color associated with the location, water clarity associated with a location, a depth at the location, a type of object positioned at the location, surface properties of the object, or an orientation of an object.

The improved brightness/color levels at certain locations in sonar images may make the sonar images easier for users to view at locations that are particularly important. Furthermore, the improved brightness/color levels may make it easier for users to make navigational decisions based on the sonar images and/or to find areas where fish are likely to be located (e.g., within structures, shipwrecks, trees, etc.).

In an example embodiment, a system for the enhancement of sonar data is provided. The system comprises one or more sonar transducer assemblies configured to provide sonar data, one or more processors, and a memory including computer program code. The computer program code is configured to, when executed, cause the one or more processors to receive the sonar data, with the sonar data providing information representative of an underwater environment around a watercraft. The computer program code is configured to, when executed, cause the one or more processors to perform adaptive contrast image processing to form adjusted sonar data. Adaptive contrast image processing adjusts a brightness level or color of the sonar data at one or more locations. The adaptive contrast image processing considers at least one of a distance of a location from a sonar transducer assembly of the one or more sonar transducer assemblies, a brightness level or color associated with the location, water clarity associated with a location, a depth at the location, a type of object positioned at the location, surface properties of the object, or an orientation of the object.

In some embodiments, the computer program code may be further configured to, when executed, cause the one or more processors to form a sonar image based on the sonar data. Adaptive contrast image processing may be performed on sonar image data of the sonar image. Additionally, in some embodiments, the computer program code may be further configured to, when executed, cause the one or more processors to cause display of the sonar image. In some embodiments, the sonar image may be a sidescan image. Furthermore, in some embodiments, the sonar data may only be capable of generating a potential sonar image in black and white, and the adjusted sonar data may cause the sonar image to be in color.

In some embodiments, adaptive contrast image processing may be performed on the sonar data before any sonar image is formed. In some embodiments, the adaptive contrast image processing may be performed using at least one of contrast stretching, histogram equalization, or fuzzy logic.

In another example embodiment, a non-transitory computer readable medium is provided having stored thereon software instructions. When executed by a processor, the software instructions cause the processor to enhance sonar data by executing operations. The operations comprise receiving the sonar data, with the sonar data providing information representative of an underwater environment around a watercraft. The operations comprise performing adaptive contrast image processing to form an adjusted sonar data. The adaptive contrast image processing adjusts a brightness level or color of the sonar data at one or more locations. The adaptive contrast image processing also considers at least one of a distance of a location from a sonar transducer assembly of the one or more sonar transducer assemblies, a brightness level or color associated with the location, water clarity associated with a location, a depth at the location, a type of object positioned at the location, surface properties of the object, or an orientation of the object.

In some embodiments, adaptive contrast image processing may be performed on the sonar data before any sonar image is formed. In some embodiments, the software instructions, when executed by a processor, may cause the processor to enhance sonar data by executing additional operations comprising forming a sonar image based on the sonar data, and adaptive contrast image processing may be performed on sonar image data of the sonar image. In some embodiments, the software instructions, when executed by a processor, may cause the processor to enhance sonar data by executing additional operations comprising causing display of the sonar image. In some embodiments, the sonar image may be a sidescan image. In some embodiments, the sonar data may only be capable of generating a potential sonar image in black and white, and the adjusted sonar data may cause the sonar image to be in color. In some embodiments, the adaptive contrast image processing may be performed using at least one of contrast stretching, histogram equalization, or fuzzy logic.

In another example embodiment, a method for the enhancement of sonar data is provided. The method comprises receiving the sonar data. The sonar data provides information representative of an underwater environment around a watercraft. The method also comprises performing adaptive contrast image processing to form an adjusted sonar data. The adaptive contrast image processing adjusts a brightness level or color of the sonar data at one or more locations. The adaptive contrast image processing considers at least one of a distance of a location from a sonar transducer assembly of the one or more sonar transducer assemblies, a brightness level or color associated with the location, water clarity associated with a location, a depth at the location, a type of object positioned at the location, surface properties of the object, or an orientation of the object.

In some embodiments, adaptive contrast image processing may be performed on the sonar data before any sonar image is formed. In some embodiments, the method may further comprise forming a sonar image based on the sonar data, and adaptive contrast image processing may be performed on sonar image data of the sonar image. Additionally, in some embodiments, the method may also comprise causing display of the sonar image. In some embodiments, the sonar data may only be capable of generating a potential sonar image in black and white, and the adjusted sonar data may cause the sonar image to be in color. In some embodiments, the adaptive contrast image processing may be performed using at least one of contrast stretching, histogram equalization, or fuzzy logic.

BRIEF DESCRIPTION OF THE DRAWINGS

Reference will now be made to the accompanying drawings, which are not necessarily drawn to scale, and wherein:

FIG. 7 illustrates a flowchart of an example method of machine learning for determining user preferences on locations of interest, in accordance with some embodiments discussed herein.

DETAILED DESCRIPTION

Example embodiments now will be described more fully hereinafter with reference to the accompanying drawings, in which some, but not all embodiments are shown. Any connections or attachments may be direct or indirect connections or attachments unless specifically noted otherwise.

Figure 1:
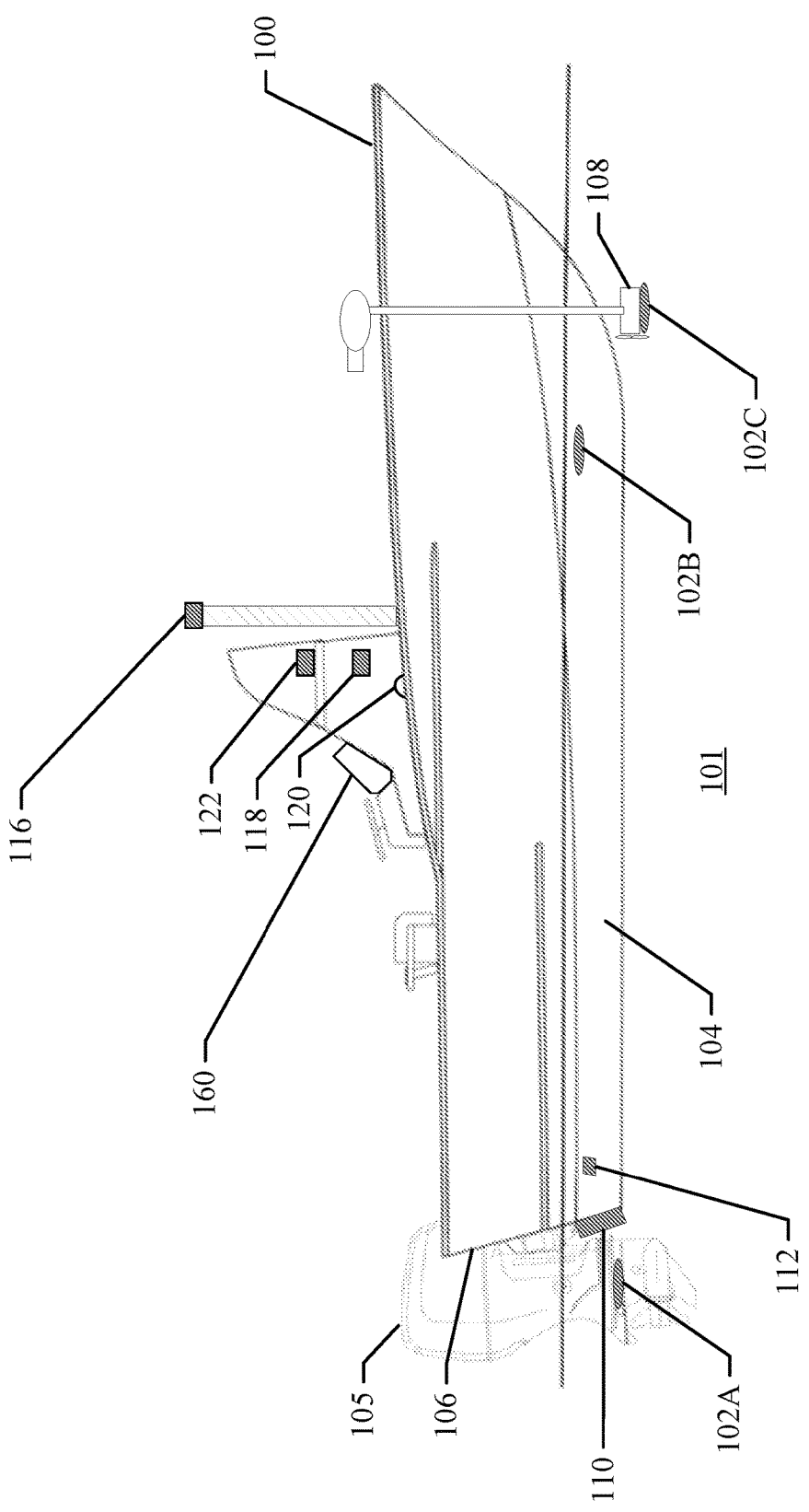
FIG. 1 is a schematic view illustrating an example watercraft including various marine devices, in accordance with some embodiments discussed herein.

FIG. 1 illustrates an example watercraft 100 including various marine devices, in accordance with some embodiments discussed herein. As depicted in FIG. 1, the watercraft 100 (e.g., a vessel) is configured to traverse a marine environment, e.g. body of water 101, and may use one or more sonar transducer assemblies 102A, 102B, and 102C disposed on and/or proximate to the watercraft. Notably, example watercraft contemplated herein may be surface watercraft, submersible watercraft, or any other implementation known to those skilled in the art. The transducer assemblies 102A, 102B, and 102C may each include one or more transducer elements (such as in the form of the example assemblies described herein) configured to transmit sound waves into a body of water, receive sonar returns from the body of water, and convert the sonar returns into sonar return data. Various types of sonar transducers may be provided—for example, a linear downscan sonar transducer, a conical downscan sonar transducer, a sonar transducer array, or a sidescan sonar transducer may be used. Each of the transducer assemblies 102A, 102B, 102C are configured to provide sonar data that may be stored and that may undergo further processing to form sonar images. The sonar data may include information representative of an underwater environment around a watercraft.

Depending on the configuration, the watercraft 100 may include a primary motor 105, which may be a main propulsion motor such as an outboard or inboard motor. Additionally, the watercraft 100 may include a trolling motor 108 configured to propel the watercraft 100 or maintain a position. The one or more transducer assemblies (e.g., 102A, 102B, and/or 102C) may be mounted in various positions and to various portions of the watercraft 100 and/or equipment associated with the watercraft 100. For example, the transducer assembly may be mounted to the transom 106 of the watercraft 100, such as depicted by transducer assembly 102A. The transducer assembly may be mounted to the bottom or side of the hull 104 of the watercraft 100, such as depicted by transducer assembly 102B. The transducer assembly may be mounted to the trolling motor 108, such as depicted by transducer assembly 102C.

The watercraft 100 may also include one or more marine electronic devices 160, such as may be utilized by a user to interact with, view, or otherwise control various aspects of the various sonar systems described herein. In the illustrated embodiment, the marine electronic device 160 is positioned proximate the helm (e.g., steering wheel) of the watercraft 100—although other places on the watercraft 100 are contemplated. Likewise, additionally or alternatively, a remote device (such as a user's mobile device) may include functionality of a marine electronic device.

The watercraft 100 may also comprise other components within the one or more marine electronic devices 160 or at the helm. In FIG. 1, the watercraft 100 comprises a radar 116, which is mounted at an elevated position (although other positions relative to the watercraft are also contemplated). The watercraft 100 also comprises an AIS transceiver 118, a direction sensor 120, and a camera 122, and these components are each positioned at or near the helm (although other positions relative to the watercraft are also contemplated). Additionally, the watercraft 100 comprises a rudder 110 at the stern of the watercraft 100, and the rudder 110 may be positioned on the watercraft 100 so that the rudder 110 will rest in the body of water 101. In other embodiments, these components may be integrated into the one or more electronic devices 160 or other devices. Another example device on the watercraft 100 includes a temperature sensor 112 that may be positioned so that it will rest within or outside of the body of water 101. Other example devices include a wind sensor, one or more speakers, and various vessel devices/features (e.g., doors, bilge pump, fuel tank, etc.), among other things. Additionally, one or more sensors may be associated with marine devices; for example, a sensor may be provided to detect the position of the primary motor 105, the trolling motor 108, or the rudder 110.

Figure 2A:
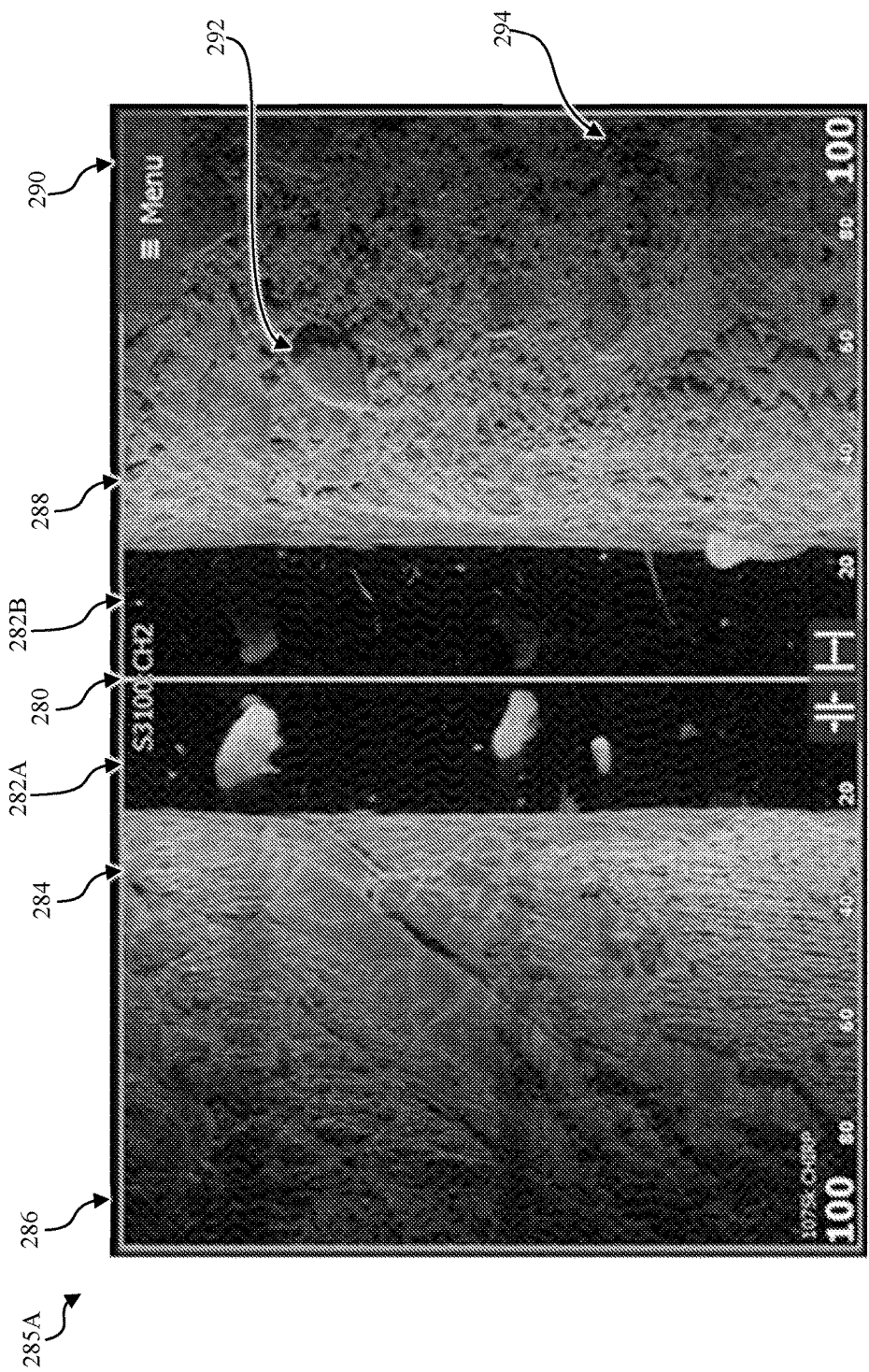
FIG. 2A is an example sidescan sonar image created without any adaptive contrast image processing techniques, in accordance with some embodiments discussed herein.

FIG. 2A is an example sonar image 285A created without any adaptive contrast image processing techniques. The sonar image 285A is a sidescan sonar image. In the sonar image 285A, a centerline 280 is illustrated, and one or more transducer assemblies used to generate the sonar data of the sonar image 285A may be positioned and aimed relative to the centerline 280. Given that the sonar image 285A is a sidescan sonar image, the transducer assemblies are sidescan sonar transducers and surface-based sonar return signals are generally not received in the zones 282A, 282B. These zones 282A, 282B correspond to locations within the water column underneath the watercraft, where typical sonar returns correspond to fish, tree branches, or other objects floating in the water column.

As illustrated in FIG. 2A, certain locations are generally presented with low brightness while others are generally presented with high brightness. For example, areas 284, 288 are located proximate to the transducer assemblies on a watercraft, and objects at areas 284, 288 are generally illustrated in the sonar image 285A with a relatively high brightness level. By contrast, areas 286, 290 are located a greater distance away from the transducer assemblies on the watercraft relative to the areas 284, 288, and the areas 286, 290 are generally illustrated in the sonar image 285A with a relatively low brightness level relative to the areas 284, 288. As the sonar signals are transmitted to areas farther away from the sonar transducer assembly such as areas 286, 290, the likelihood that sonar return signals will be reflected back to the transducer assemblies gets smaller.

Additionally, in some embodiments, brightness and/or color in images may be dependent on the type of objects presented in the sonar image or the surface properties of an object in the sonar image. For example, some objects such as the rock 292 may have harder surfaces and other surface properties that cause a high amount (or concentration) of sonar return signals to be reflected back from the rock 292 towards the transducer assembly on the watercraft. Meanwhile, other objects such as the terrain 294 may have different surface properties that cause a relatively lower amount of sonar return signals to be reflected back from the terrain 294 at a location towards the transducer assembly.

Additionally, the orientation of an object relative to a transducer assembly may impact the brightness of the object of the sonar image. Where an object like the rock 292 has surfaces that face towards the transducer assembly, these surfaces may tend to reflect more sonar return signals back towards the transducer assembly as compared to other surfaces.

The low brightness levels at certain locations in sonar images often makes the sonar images difficult to view for users. Furthermore, the low brightness levels make it more difficult for users to make navigational decisions based on the sonar images and/or to find areas where fish are likely to be located.

Figure 2B:
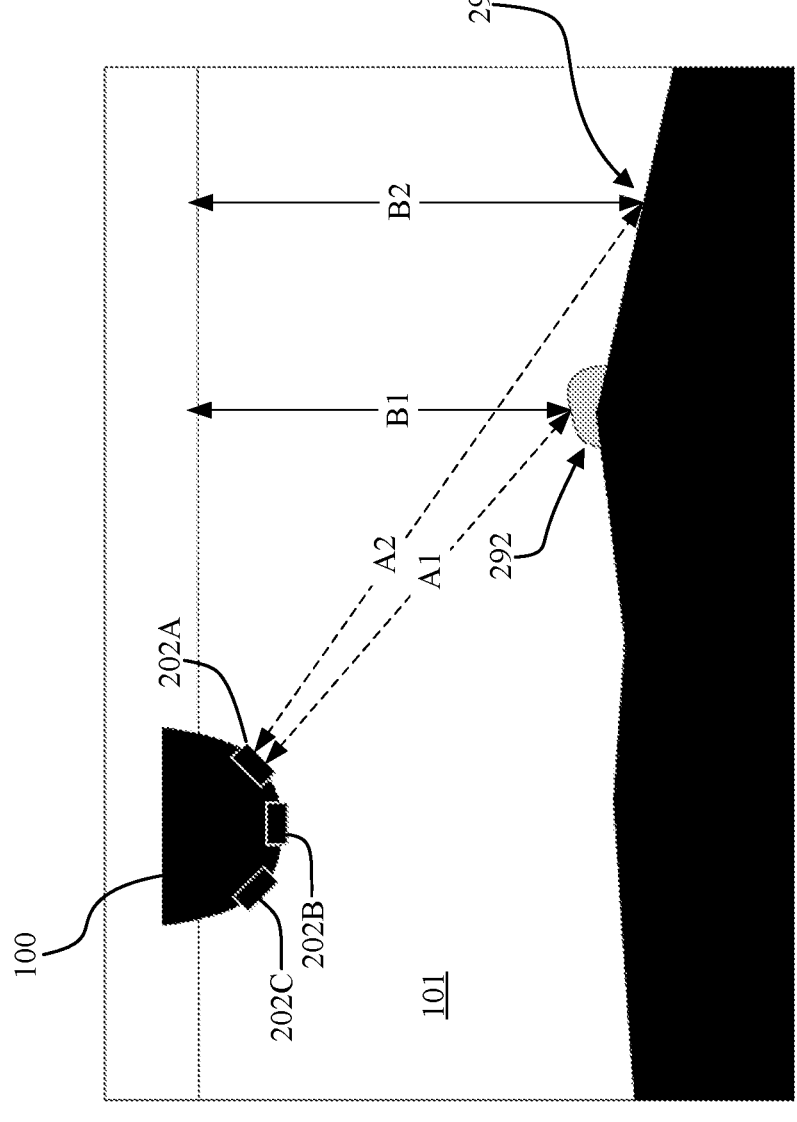
FIG. 2B a schematic view of an underwater environment around the watercraft of FIG. 2A, in accordance with some embodiments discussed herein.

FIG. 2B is a schematic view of an underwater environment around a watercraft 100. In FIG. 2B, three different transducer assemblies are illustrated on the watercraft 100, including a first transducer assembly 202A, second transducer assembly 202B, and a third transducer assembly 202C. The first transducer assembly 202A and the third transducer assembly 202C are both sidescan sonar transducer assemblies that are configured to emit sonar beams into the body of water 101 towards the sides of the watercraft 100, and the second transducer assembly 202B is a downscan sonar transducer assembly that is configured to emit sonar beams into the body of water 101 towards locations directly underneath a watercraft. However, other transducer assemblies may be included, and transducer assemblies 202A, 202B, 202C may be provided in different types in other embodiments. Each of the transducer assemblies 202A, 202B, 202C may be configured to provide sonar data that may be stored and that may undergo further processing to form sonar images, and the sonar data may include information representative of an underwater environment around a watercraft.

The rock 292 and the terrain 294 of FIG. 2A are reproduced in the schematic illustration of FIG. 2B. The rock 292 is positioned at a distance A1 away from the first transducer assembly 202A, and the terrain 294 is positioned at a distance A2 away from the first transducer assembly 202A. The rock 292 is positioned closer to the first transducer assembly 202A relative to the terrain 294 such that the distance A1 is less than the distance A2. Due to the increased distance A2 for the terrain 294 and due to other factors, the terrain 294 is presented in the sonar image 285A of FIG. 2A with a lower brightness relative to the rock 292.

The rock 292 is positioned at a depth B1 relative to the surface of the body of water 101, and the terrain 294 is positioned at a depth B2 relative to the surface of the body of water 101. The rock 292 is positioned at a shallower depth relative to the terrain 294 such that the depth B1 is less than the depth B2. Due to the increased depth B2 for the terrain 294 and due to other factors, the terrain 294 is presented in the sonar image 285A of FIG. 2A with a lower brightness relative to the rock 292.

Additionally, the surfaces of the rock 292 have more surfaces that face the first transducer assembly 202A compared to the terrain 294, which is downwardly sloping towards the right in FIG. 2B. The orientation of the surfaces at the rock 292 and the terrain 294 may also cause the rock 292 to be represented with greater brightness in the sonar image 285A relative to the terrain 294.

Figure 3:
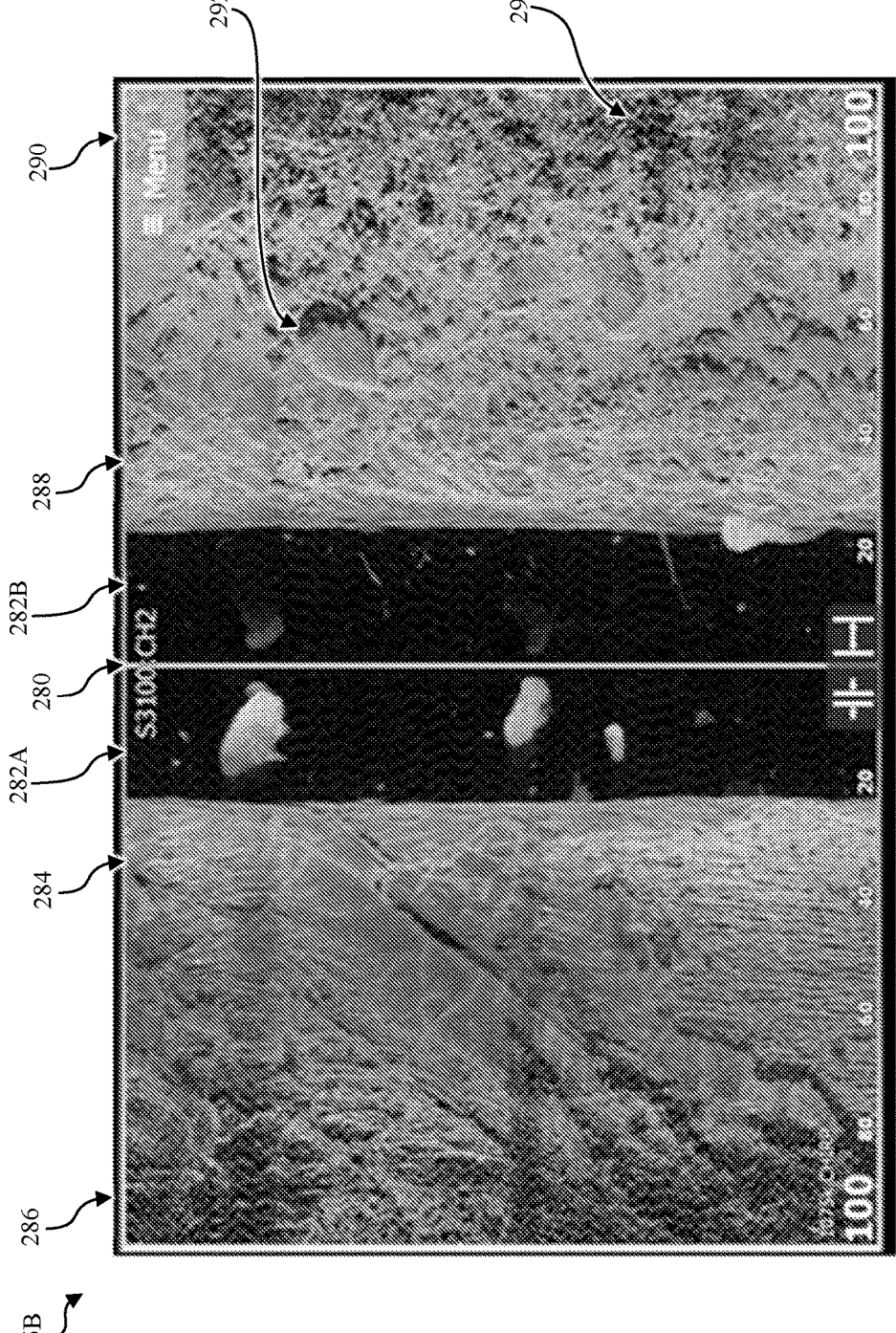
FIG. 3 is an example sidescan sonar image created using adaptive contrast image processing techniques, in accordance with some embodiments discussed herein.

FIG. 3 is an example sidescan sonar image 285B created using adaptive contrast image processing techniques. The brightness levels within the sonar image 285B are maintained at more uniform levels throughout the sonar image 285B. For example, the objects represented at areas 284, 288 are generally represented in the sonar image 285B with a brightness level similar to the areas 286, 290. With the increased brightness at the areas 286, 290, it may be easier for users to view these areas 286, 290. Furthermore, the improved brightness levels may make it easier for users to use the sonar image 285B to make navigational decisions and/or to find areas where fish are likely to be located. Adaptive contrast image processing techniques may be utilized to increase the brightness levels at certain locations, but the techniques may also be used to decrease the brightness levels at certain locations as well. Likewise, color may be adjusted at certain locations, such as to highlight certain objects.

Returning to FIG. 3, the terrain 294 is illustrated with significantly increased brightness and contrast level in the sonar image 285B of FIG. 3 relative to the sonar image 285A of FIG. 2A. This may allow the user to have better visibility of the terrain 294, allowing the user to determine whether or not the user would like to navigate to a location proximate to the terrain 294 and allowing the user to better determine if the terrain 294 is a location where fish are likely to be located. While terrain 294 is used as one example of an object that may be shown with enhanced brightness levels and improved contrast levels, other objects may also be shown in sonar images with enhanced brightness levels. For example, other underwater objects may be shown with enhanced brightness and contrast levels such as reefs, underwater trees, shipwrecks, rocks, slopes, etc. The enhanced brightness and contrast levels of these objects may enable a user to make more well-informed decisions, such as when the user is attempting to locate fish. While the sonar images illustrated in FIGS. 2A and 3 are sidescan sonar images, other types of sonar images may be formed as well, such as downscan sonar images and other sonar images.

As noted herein, adaptive contrast image processing may be performed to form adjusted sonar data, such as for use in forming an adjust sonar image. For example, adaptive contrast image processing adjusts a brightness level or color of the sonar data at one or more locations. The adaptive contrast image processing may consider a variety of factors in adjusting the brightness level or color of the sonar data.

As an example, in some embodiments, the adaptive contrast image processing techniques may consider a distance of a location from a sonar transducer assembly of the one or more sonar transducer assemblies. For example, the distance A1 of the rock 292 from the first transducer assembly 202A illustrated in FIG. 2B may be considered in performing adaptive contrast image processing techniques, and the distance A2 of the terrain 294 from the first transducer assembly 202A illustrated in FIG. 2B may also be considered in performing adaptive contrast image processing techniques.

A brightness level or color associated with the location may be considered in performing adaptive contrast image processing techniques. In some embodiments, the adaptive contrast image processing techniques may identify where the brightness level over a larger area tends to have substantially different brightness levels relative to other areas. Where this is the case, the differences in brightness may be attributable to larger scale issues that negatively impact the quality of the image as a whole (as opposed to more localized differences at a significant location, which may be indicative of certain structure or objects at a location).

A water clarity associated with a location may be considered in performing adaptive contrast image processing techniques. For example, where the water clarity at one location is improved relative to the water clarity at another location, the sonar image may generally have increased brightness at the location having improved water clarity. By performing adaptive contrast image processing techniques, this difference in water clarity may be considered to provide increased brightness in the sonar images at locations having lower water clarity. In some embodiments, the differences in water clarity may be identified between two different locations in a single sonar image.

A depth at a location may be considered in performing adaptive contrast image processing techniques. For example, the depth B1 of the rock 292 from the surface of the body of water 101 illustrated in FIG. 2B may be considered in performing adaptive contrast image processing techniques, and the depth B2 of the terrain 294 from the first transducer assembly 202A illustrated in FIG. 2B may also be considered in performing adaptive contrast image processing techniques. In some cases, brightness levels may be lower at locations provided at increased depths, so the adaptive contrast image processing techniques may tend to increase the brightness level as the depths are increased. Adaptive contrast image processing techniques may also be used to reduce the brightness level for areas at reduced depths where desired.

A type of object and/or surface properties of an object may be considered in performing adaptive contrast image processing techniques. For example, some objects such as the rock 292 may have harder surfaces and other surface properties that cause a high amount of sonar return signals to be reflected back from the rock 292 towards the transducer assembly on the watercraft. Meanwhile, other objects such as the terrain 294 may have different surface properties that cause a relatively lower amount of sonar return signals to be reflected back from the terrain 294 towards the transducer assembly. The adaptive contrast image processing techniques may take the type of object and the surface properties into consideration and provide adjusted brightness levels (e.g., providing increased brightness levels at identified types of objects and surfaces that tend to have lower brightness levels).

An orientation of the object may be considered in performing adaptive contrast image processing techniques. For example, at the rock 292 of FIG. 2B, certain surfaces generally face towards the first transducer assembly 202A while other surfaces of the terrain 294 generally face away from the first transducer assembly 202A. In such a situation, the adaptive contrast image processing techniques may take these orientations into consideration and provide adjusted brightness levels (e.g., providing increased brightness at surfaces that are oriented so that they face away from the first transducer assembly 202A).

Adaptive contrast image processing may be performed using a variety of different approaches. For example, adaptive contrast image processing may be performed using at least one of contrast stretching, histogram equalization, fuzzy logic, or intensity value mapping. With contrast stretching, the minimum and maximum brightness levels within an image may be adjusted to match desired minimum and maximum brightness levels, and other brightness levels may be adjusted proportionally based on the changes to the minimum and maximum brightness levels.

Histogram equalization may be used to adjust the brightness levels where a large number of locations are presented with a similar brightness level. Ordinarily, certain brightness levels are shown in a sonar image with a high frequency and certain brightness levels are shown in a sonar image with a low frequency. Histogram equalization may normalize the frequencies at which each brightness level is shown. For example, brightness levels shown at higher frequencies are spread to other nearby brightness levels, thereby reducing the frequency at which certain brightness levels are used and providing increased contrast levels in certain areas.

Figure 4:
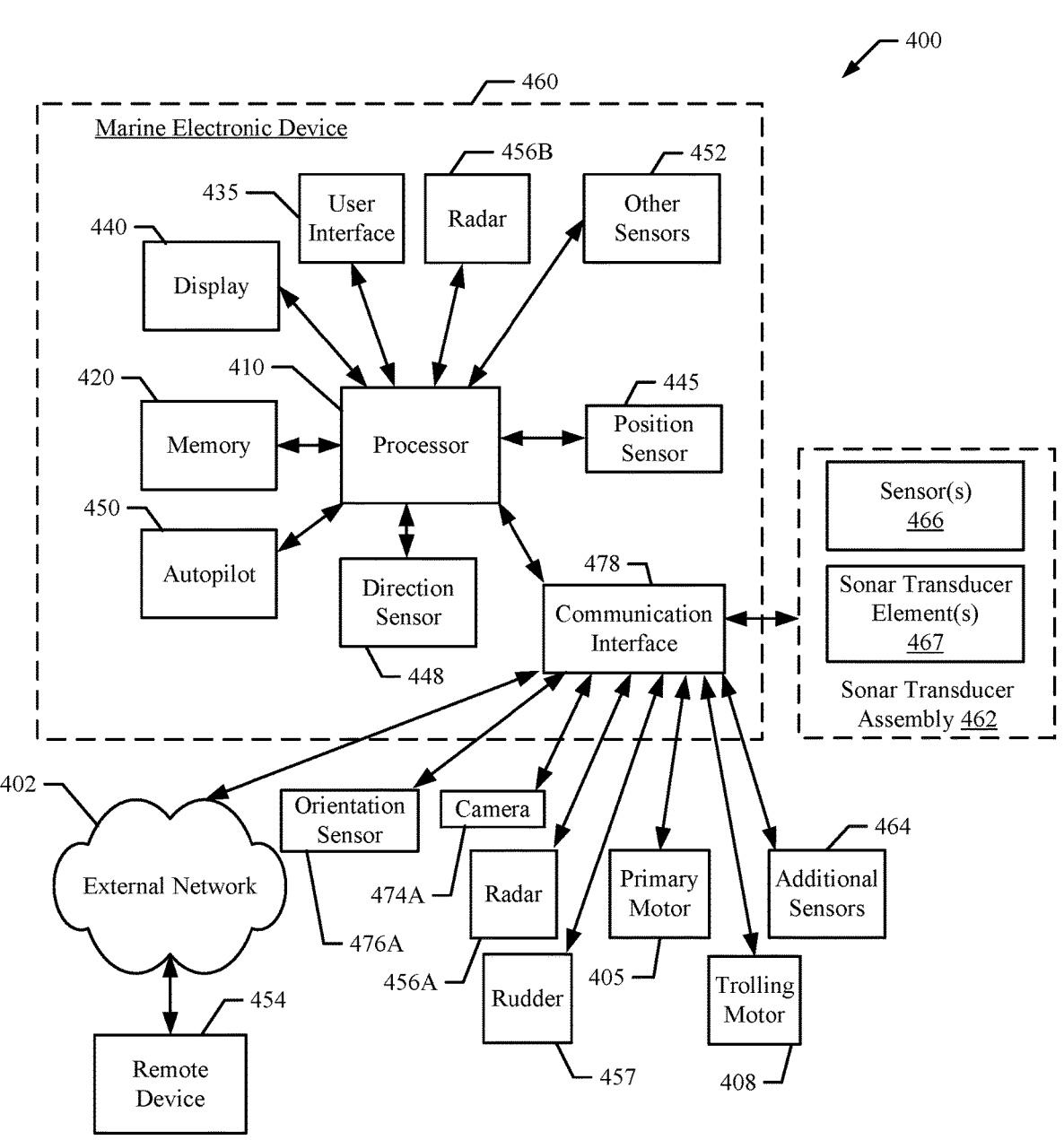
FIG. 4 is a block diagram illustrating an example system with various electronic devices, marine devices, and secondary devices shown, in accordance with some embodiments discussed herein.

The watercraft may have systems thereon including various electrical components, and FIG. 4 is a block diagram illustrating electrical components that may be provided on in one example system. The system 400 may comprise numerous marine devices. As shown in FIG. 4, a sonar transducer assembly 462, a radar 456A, a rudder 457, a primary motor 405, a trolling motor 408, a camera 474A, and additional sensors/devices 464 may be provided as marine devices, but other marine devices may also be provided. One or more marine devices may be implemented on the marine electronic device 460 as well. For example, a position sensor 445, a direction sensor 448, an autopilot 450, a GNSS sensor 421, and other sensors/devices 452 may be provided within the marine electronic device 460. These marine devices may be integrated within the marine electronic device 460, integrated on a watercraft at another location and connected to the marine electronic device 460, and/or the marine devices may be implemented at a remote device 454 in some embodiments. For example, the GNSS receiver 421, may be positioned at another location on a watercraft outside of the marine electronic device 460. The system 400 may include any number of different systems, modules, or components; each of which may comprise any device or means embodied in either hardware, software, or a combination of hardware and software configured to perform one or more corresponding functions described herein.

The marine electronic device 460 may include at least one processor 410, a memory 420, a communications interface 478, a user interface 435, a display 440, autopilot 450, and one or more sensors (e.g., position sensor 445, direction sensor 448, other sensors/devices 452). One or more of the components of the marine electronic device 460 may be located within a housing or could be separated into multiple different housings (e.g., be remotely located).

The processor(s) 410 may be any means configured to execute various programmed operations or instructions stored in a memory device (e.g., memory 420) such as a device or circuitry operating in accordance with software or otherwise embodied in hardware or a combination of hardware and software (e.g. a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor(s) 410 as described herein.

In an example embodiment, the memory 420 may include one or more non-transitory storage or memory devices such as, for example, volatile and/or non-volatile memory that may be either fixed or removable. The memory 420 may be configured to store instructions, computer program code, radar data, and additional data such as sonar data, chart data, location/position data in a non-transitory computer readable medium for use, such as by the processor(s) 410 for enabling the marine electronic device 460 to carry out various functions in accordance with example embodiments of the present invention. For example, the memory 420 could be configured to buffer input data for processing by the processor(s) 410. Additionally or alternatively, the memory 420 could be configured to store instructions for execution by the processor(s) 410. The memory 420 may include computer program code that is configured to, when executed, cause the processor(s) 410 to perform various methods described herein. The memory 420 may serve as a non-transitory computer readable medium having stored thereon software instructions that, when executed by a processor, cause methods described herein to be performed.

In some embodiments, computer program products described herein may be accomplished as software updates. Material for the computer program products may be uploaded from a remote device 454 such as a server, this material may be received via the external network 402, and the material may be stored in the memory 420 so that it may be executed by the processor(s) 410. In the example of FIG. 4, the material is stored in memory 420 alongside other data, and the processor(s) 410 are not dedicated to solely execute the material for the computer program products. However, in some embodiments, the material for computer program products may be provided on an additional piece of hardware that is added to the system 400. In some embodiments, the computer program products may be stored in its own dedicated memory and/or may be executed on its own dedicated processor.

The communications interface 478 may be configured to enable communication to external systems (e.g. an external network 402). In this manner, the marine electronic device 460 may retrieve stored data from a remote device 454 via the external network 402 in addition to or as an alternative to the onboard memory 420. Additionally or alternatively, the marine electronic device 460 may transmit or receive data, such as radar signal data, radar return data, radar image data, path data, or the like to or from a sonar transducer assembly 462. In some embodiments, the marine electronic device 460 may also be configured to communicate with other devices or systems (such as through the external network 402 or through other communication networks, such as described herein). For example, the marine electronic device 460 may communicate with a propulsion system of the watercraft 100 (e.g., for autopilot control); a remote device (e.g., a user's mobile device, a handheld remote, etc.); or another system.

The communications interface 478 of the marine electronic device 460 may also include one or more communications modules configured to communicate with one another in any of a number of different manners including, for example, via a network. In this regard, the communications interface 478 may include any of a number of different communication backbones or frameworks including, for example, Ethernet, the NMEA 2000 framework, GPS, cellular, Wi-Fi, or other suitable networks. The network may also support other data sources, including GPS, autopilot, engine data, compass, radar, etc. In this regard, numerous other peripheral devices (including other marine electronic devices or transducer assemblies) may be included in the system 400.

The position sensor 445 may be configured to determine the current position and/or location of the marine electronic device 460 (and/or the watercraft 100). For example, the position sensor 445 may comprise a GPS, bottom contour, inertial navigation system, such as machined electromagnetic sensor (MEMS), a ring laser gyroscope, or other location detection system. Alternatively or in addition to determining the location of the marine electronic device 460 or the watercraft 100, the position sensor 445 may also be configured to determine the position and/or orientation of an object outside of the watercraft 100.

The display 440 (e.g. one or more screens) may be configured to present images and may include or otherwise be in communication with a user interface 435 configured to receive input from a user. The display 440 may be, for example, a conventional LCD (liquid crystal display), a touch screen display, mobile device, or any other suitable display known in the art upon which images may be displayed.

In some embodiments, the display 440 may present one or more sets of data (or images generated from the one or more sets of data). Such data includes chart data, radar data, sonar data, weather data, location data, position data, orientation data, sonar data, or any other type of information relevant to the watercraft. Radar data may be received from radar 456A located outside of a marine electronic device 460, radar 456B located in a marine electronic device 460, or from radar devices positioned at other locations, such as remote from the watercraft. Additional data may be received from marine devices such as a sonar transducer assembly 462, a primary motor 405 or an associated sensor, a trolling motor 408 or an associated sensor, an autopilot 450, a rudder 457 or an associated sensor, a position sensor 445, a direction sensor 448, other sensors/devices 452, a remote device 454, onboard memory 420 (e.g., stored chart data, historical data, etc.), or other devices.

The user interface 435 may include, for example, a keyboard, keypad, function keys, buttons, a mouse, a scrolling device, input/output ports, a touch screen, or any other mechanism by which a user may interface with the system.

Although the display 440 of FIG. 4 is shown as being directly connected to the processor(s) 410 and within the marine electronic device 460, the display 440 could alternatively be remote from the processor(s) 410 and/or marine electronic device 460. Likewise, in some embodiments, the position sensor 445 and/or user interface 435 could be remote from the marine electronic device 460.

The marine electronic device 460 may include one or more other sensors/devices 452, such as configured to measure or sense various other conditions. The other sensors/devices 452 may include, for example, an air temperature sensor, a water temperature sensor, a current sensor, a light sensor, a wind sensor, a speed sensor, or the like.

A sonar transducer assembly 462 is also provided in the system 400. The sonar transducer assembly 462 illustrated in FIG. 4 may include one or more sonar transducer elements 467, such as may be arranged to operate alone or in one or more transducer arrays. In some embodiments, additional separate sonar transducer elements (arranged to operate alone, in an array, or otherwise) may be included. As indicated herein, the sonar transducer assembly 462 may also include a sonar signal processor or other processor (although not shown) configured to perform various sonar processing. In some embodiments, the processor (e.g., processor(s) 410 in the marine electronic device 460, a controller (or processor portion) in the sonar transducer assembly 462, or a remote controller—or combinations thereof) may be configured to filter sonar return data and/or selectively control sonar transducer element(s) 467. For example, various processing devices (e.g., a multiplexer, a spectrum analyzer, A-to-D converter, etc.) may be utilized in controlling or filtering sonar return data and/or transmission of sonar signals from the sonar transducer element(s) 467. The processor(s) 410 may also be configured to filter data regarding certain objects out of map data.

The sonar transducer assembly 462 may also include one or more other systems, such as various sensor(s) 466. For example, the sonar transducer assembly 462 may include an orientation sensor, such as gyroscope or other orientation sensor (e.g., accelerometer, MEMS, etc.) that may be configured to determine the relative orientation of the sonar transducer assembly 462 and/or the one or more sonar transducer element(s) 467—such as with respect to a forward direction of the watercraft. In some embodiments, additionally or alternatively, other types of sensor(s) are contemplated, such as, for example, a water temperature sensor, a current sensor, a light sensor, a wind sensor, a speed sensor, or the like. While only one sonar transducer assembly 462 is illustrated in FIG. 4, additional sonar transducer assemblies may be provided in other embodiments. However, in other embodiments, one or more orientation sensors 476A may be provided at other locations on a watercraft to determine the orientation of the watercraft itself or the orientation of a particular component on the watercraft.

The components presented in FIG. 4 may be rearranged to alter the connections between components. For example, in some embodiments, a marine device outside of the marine electronic device 460, such as the radar 456A, may be directly connected to the processor(s) 410 rather than being connected to the communications interface 478. Additionally, sensors and devices implemented within the marine electronic device 460 may be directly connected to the communications interface in some embodiments rather than being directly connected to the processor(s) 410.

Figure 5:
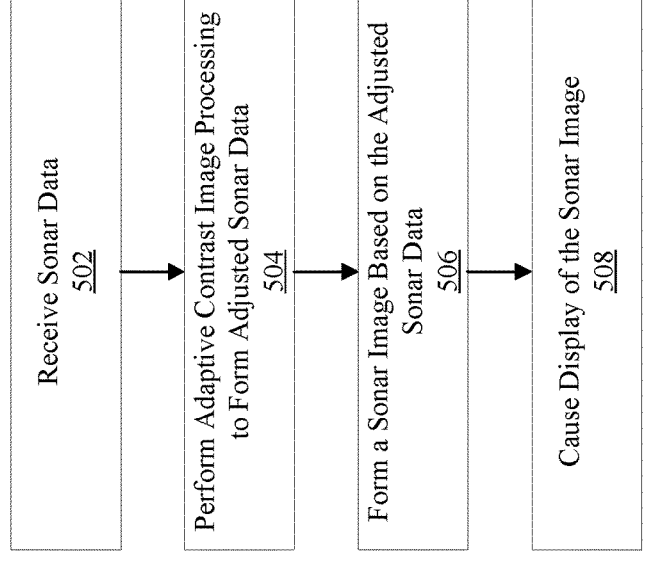
FIG. 5 is a flow chart illustrating an example method for performing adaptive contrast image processing techniques, in accordance with some embodiments discussed herein.

Various methods for performing adaptive contrast image processing techniques are also contemplated. FIG. 5 is a flow chart illustrating an example method 500 for performing adaptive contrast image processing techniques to enhance sonar data. In the method 500, the adaptive contrast image processing is performed on sonar data before any sonar image is formed.

At operation 502, sonar data is received. The sonar data provides information representative of an underwater environment around a watercraft. The sonar data may be received from a sonar transducer assembly 462 (see FIG. 4), a component within the sonar transducer assembly 462, a remote device 454 (see FIG. 4), or some other component.

At operation 504, adaptive contrast image processing is performed to form adjusted sonar data. The adaptive contrast image processing adjusts a brightness level or color of the sonar data at one or more locations. The adaptive contrast image processing considers at least one of a distance of a location from a sonar transducer assembly of the one or more sonar transducer assemblies, a brightness level or color associated with the location, water clarity associated with a location, a depth at the location, a type of object positioned at the location, surface properties of the object, or an orientation of the object. User preferences may also be accounted for in the adaptive contrast image processing to provide adjust the brightness and/or increase the amount contrast at certain locations. For example, where a location is determined to be important to the user or to other users, adaptive contrast image processing may be performed at the location or adaptive contrast image processing may be performed to a greater degree at the location.

At operation 506, a sonar image is formed based on the adjusted sonar data. In some embodiments, the sonar image may be a sidescan sonar image, but other sonar images may be formed as well such as a downscan sonar image. In some embodiments, the sonar data is only capable of generating a potential sonar image in black and white, and the adjusted sonar data is capable of generating a color sonar image that is in color.

At operation 508, display of the sonar image is caused. Display may be caused on a display 440 (see FIG. 4) of a marine electronic device 460 (see FIG. 4) in some embodiments. However, display of the sonar image may be caused on another display such as on the display of a remote device 454 (see FIG. 4).

Figure 6:
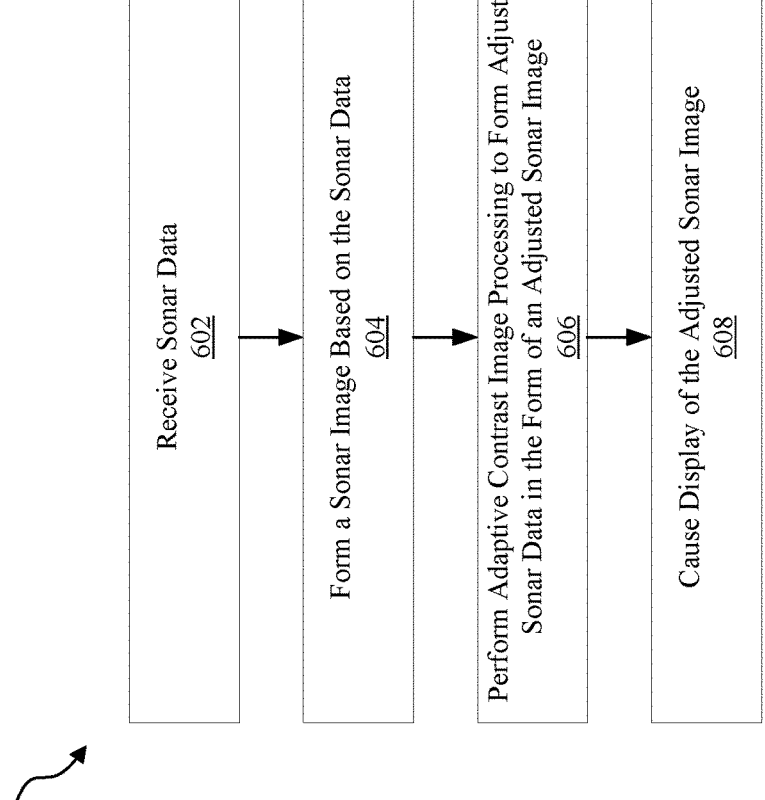
FIG. 6 is a flow chart illustrating another example method for performing adaptive contrast image processing techniques, in accordance with some embodiments discussed herein.

Adaptive contrast image processing techniques may also be implemented using other approaches. FIG. 6 is a flow chart illustrating another example method 600 for performing adaptive contrast image processing techniques to enhance sonar data. In the method 600, the adaptive contrast image processing techniques are performed after a sonar image is created and the adaptive contrast image processing techniques are performed on the sonar image data of the sonar image At operation 602, sonar data is received. The sonar data provides information representative of an underwater environment around a watercraft. The sonar data may be received from a sonar transducer assembly 462 (see FIG. 4), a component within the sonar transducer assembly 462, a remote device 454 (see FIG. 4), or some other component.

At operation 604, a sonar image is formed based on the sonar data. In some embodiments, the sonar image may be a sidescan sonar image, but other sonar images may be formed as well such as a downscan sonar image.

At operation 606, adaptive contrast image processing is performed to form adjusted sonar data in the form of an adjusted sonar image. In some embodiments, the sonar data is only capable of generating a potential sonar image in black and white, and the adjusted sonar image is in color. The adaptive contrast image processing adjusts a brightness level or color of the sonar data at one or more locations. The adaptive contrast image processing considers at least one of a distance of a location from a sonar transducer assembly of the one or more sonar transducer assemblies, a brightness level or color associated with the location, water clarity associated with a location, a depth at the location, a type of object positioned at the location, surface properties of the object, or an orientation of the object. User preferences may also be accounted for in the adaptive contrast image processing to provide adjust the brightness and/or increase the amount contrast at certain locations. For example, where a location is determined to be important to the user or to other users, adaptive contrast image processing may be performed at the location or adaptive contrast image processing may be performed to a greater degree at the location.

At operation 608, display of the sonar image is caused. Display may be caused on a display 440 (see FIG. 4) of a marine electronic device 460 (see FIG. 4) in some embodiments. However, display of the sonar image may be caused on another display such as on the display of a remote device 454 (see FIG. 4).

FIG. 7 illustrates a flowchart of an example method 700 of machine learning, such as may be utilized with artificial intelligence for various embodiments of the present invention. As described herein in various embodiments, at least one processor or another suitable device may be configured to develop a model for adaptive contrast image processing, with the model accounting for, for example, user preferences over time and common occurrences in certain bodies of water, among other things. In some embodiments, a marine electronic device 460 (see FIG. 4) may comprise one or more processors that perform the functions shown in FIG. 7.

In some embodiments, the method may be executed to account for the user preferences of only one user so that user preferences are determined for that user and so that the model is tailored to that particular user. In some embodiments, the method may be executed so that it accounts for the user preferences of multiple users, and this may be beneficial to obtain a large amount of data to form a model. In some embodiments, an initial model may be formed that accounts for the user preferences of multiple users, and, once deployed for use with a particular user, this model may be adapted over time to account for the preferences of the particular user.

The system may account for certain indications from the user regarding locations that the user prefers to travel to. For example, the system may obtain indications on the user preferences when a user selects a particular location on a display, when a user enhances a particular location on a display, and when a user travels to a particular location and remains at that location for a time period. However, these indications may be obtained in other ways as well. The system may also obtain and utilize data regarding for the type of watercraft, the size or shape of the watercraft, demographic information about one or more users, the environment around the watercraft, various user actions on a display, a user interface, or some other action, etc. The developed model may assign different weights to different types of data that are provided.

In some systems, even after the model is deployed, the systems may beneficially improve the developed model by analyzing further data points. By utilizing artificial intelligence, effective adaptive contrast image processing techniques may be implemented to enhance sonar images that are presented in the display. By utilizing artificial intelligence, the user preferences may be determined to identify locations of great importance to a user, and adaptive contrast image processing may be executed so that these locations are presented in sonar images with improved brightness levels, enhanced contrast, indicators to represent the importance of the locations, etc.

By receiving several different types of data, the example method 700 may be performed to generate complex models. The example method 700 may find relationships between different types of data that may not have been anticipated. By detecting relationships between different types of data, the method 700 may generate accurate models even where a limited amount of data is available.

In some embodiments, the model may be continuously improved even after the model has been deployed. Thus, the model may be continuously refined based on changes in the systems or in the environment over time or based on user preferences that are received over time, which provides a benefit as compared with other models that stay the same after being deployed. The example method 700 may also refine the deployed model to fine-tune weights that are provided to various types of data based on subtle changes in the watercraft, the environment, or the user's preferences. In embodiments where an initial model is formed using data from multiple users and where the model is subsequently refined after being deployed based on data from a particular user, the data obtained after being deployed may be weighted more strongly than other data obtained before the model is deployed.

The method 700 may continuously refine a deployed model to quickly account for the changes and provide a revised model that is accurate. This may be particularly beneficial where certain parts of the watercraft are replaced, modified, or damaged or where there are swift changes in the environment. By contrast, where a model is not continuously refined, changes to the watercraft or the surrounding environment may make the model inaccurate until a new model may be developed and implemented, and implementation of a new model may be very costly, time-consuming, and less accurate than a continuously refined model. Continuous refinement may also be beneficial for novice users whose preferences may tend to change significantly. For example, a particular location may be important to a user at a first time, but the user may later determine that the location and other similar locations are actually less important to the user as the user gains experience.

At operation 702, one or more data points are received. These data points may or may not be the initial data points being received. These data points preferably comprise known data on user preferences, or some other characteristic that the model may be used to predict. The data points provided at operation 702 will preferably be historical data points with verified values to ensure that the model generated will be accurate. The data points may take the form of discrete data points. However, where the data points are not known at a high confidence level, a calculated data value may be provided, and, in some cases, a standard deviation or uncertainty value may also be provided to assist in determining the weight to be provided to the data value in generating a model. In this regard, the model predicted user preferences may be formed based on historical data.

For example, the model may be formed based on historical data regarding user actions and additional data regarding the user, the watercraft, the environment, etc. Additional data may be provided from a variety of sources, and additional data may, for example, be historical data from user selections of a particular location or geographical area on the display, from user(s) enhancing a particular location or geographical area on a display, and from additional data that is gathered. Historical data may also be provided by experts, with experts identifying locations of interest within a sonar image. However, historical data may be obtained in other ways as well. This model may be formed to predict the locations on the images that the user(s) is particularly interested in. A processor may be configured to utilize the developed model to perform adaptive contrast image processing. This model may be developed through machine learning utilizing artificial intelligence. Alternatively, a model may be developed through artificial intelligence. A processor may be configured to use the model and input information regarding user actions and additional data into the model to determine user preferences regarding locations of interest. Models may be formed by comparing historical data regarding user actions and additional data to other historical data regarding locations or areas that user(s) are particularly interested in.

At operation 704, a model is improved by minimizing error between data regarding predicted user preferences and actual data regarding user preferences. In some embodiments, an initial model may be provided or selected by a user. The user may provide a hypothesis for an initial model, and the method 700 may improve the initial model. However, in other embodiments, the user may not provide an initial model, and the method 700 may develop the initial model at operation 704, such as during the first iteration of the method 700. The process of minimizing error may be similar to a linear regression analysis on a larger scale where three or more different variables are being analyzed, and various weights may be provided for the variables to develop a model with the highest accuracy possible. Where a certain variable has a high correlation with the user preferences, that variable may be given increased weight in the model. For example, where environment data regarding the environment around the watercraft is available, that data may be provided alongside other data, and the model may be optimized to give the environment data its appropriate weight. In refining the model, the component performing the method 700 may perform a very large number of complex computations. Sufficient refinement results in an accurate model.

In some embodiments, the accuracy of the model may be checked. For example, at operation 706, the accuracy of the model is determined. This may be done by calculating the error between the model predicted outputs generated by the model and the actual outputs. In some embodiments, error may also be calculated before operation 704. By calculating the accuracy or the error, the method 700 may determine if the model needs to be refined further or if the model is ready to be deployed. Where the model predicted output is a qualitative value or a categorical value, the accuracy may be assessed based on the number of times the predicted value was correct. Where the model predicted output is a quantitative value, the accuracy may be assessed based on the difference between the actual value and the predicted value.

At operation 708, a determination is made as to whether the calculated error is sufficiently low. A specific threshold value may be provided in some embodiments. For example, where the model is used to predict whether or not a particular location is important to the user, the error may be evaluated by determining the percentage of times where the model successfully predicts whether a location is a location of interest, and the determination may evaluate whether the percentage is above a required threshold (e.g., 25%, 50%, 75%, 90%, 95%, etc.). However, other threshold values may be used, and the threshold value may be altered by the user in some embodiments. If the error rate is not sufficiently low, then the method 700 may proceed back to operation 702 so that one or more additional data points may be received. If the error rate is sufficiently low, then the method 700 proceeds to operation 710. Once the error rate is sufficiently low, the training phase for developing the model may be completed, and the implementation phase may begin where the model may be used to predict the expected object characteristic and/or object-type.

By completing operations 702, 704, 706, and 708, a model may be refined through machine learning utilizing artificial intelligence based on the historical comparisons. Notably, example model generation and/or refinement may be accomplished even if the order of these operations is changed, if some operations are removed, or if other operations are added.

After the model has been successfully trained, the model may be implemented as illustrated from operations 710-712. In some embodiments, the model may be modified (e.g., further refined) based on the received data points, such as at operation 714.

At operation 710, further data points are received. For these further data points, the actual data regarding user preferences. At operation 712, the model may be used to provide a predicted output data value for the further data points. Thus, the model may be utilized to determine the user preferences.

At operation 714, the model may be modified based on supplementary data points, such as those received during operation 710 and/or other data points. The system may account for data regarding indications from the user about locations that the user prefers to travel to. For example, the system may obtain data regarding user preferences when a user selects a particular location on a display, when a user enhances a particular location on a display, and when a user travels to a particular location and remains at that location for a time period. Data may also be provided related to other user actions, the user, the watercraft, the environment, etc. By providing supplementary data points, the model may continuously be improved even after the model has been deployed. The supplementary data points may be the further data points received at operation 710, or the supplementary data points may be provided to the processor from some other source. In some embodiments, the processor(s) or the other component performing the method 700 may receive additional data and verify the further data points received at operation 710 using this additional data. By doing this, the method 700 may prevent errors in the further data points from negatively impacting the accuracy of the model.

In some embodiments, supplementary data points are provided to the processor from some other source and are utilized to improve the model. For example, supplementary data points may be saved to a memory 420 (see FIG. 4) associated with at least one processor 410 (see FIG. 4) via communication interface 478 (see FIG. 4), or the supplementary data points may be sent through the external network 402 (see FIG. 4) from a remote device 454 (see FIG. 4). These supplementary data points may be verified before being provided to the processor(s) 410 to improve the model, or the processor(s) 410 may verify the supplementary data points utilizing additional data.

As indicated above, in some embodiments, operation 714 is not performed and the method proceeds from operation 712 back to operation 710. In other embodiments, operation 714 occurs before operation 712 or simultaneously with operation 712. Upon completion, the method 700 may return to operation 710 and proceed on to the subsequent operations. Supplementary data points may be the further data points received at operation 710 or some other data points.

In some embodiments, the methods 500, 600, 700 may be executed by a processor and may be stored as software instructions and/or computer program code in a non-transitory computer readable medium and/or memory. However, the methods 500, 600, 700 may be performed by a wide variety of items. Additionally, the operations of methods 500, 600, 700 may be performed in various orders, and some of the operations may be performed simultaneously in some embodiments. Some of the operations of methods 500, 600, 700 may not be performed in some embodiments. In some embodiments, additional operations may be included in the methods 500, 600, 700.

CONCLUSION

Many modifications and other embodiments set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A system for the enhancement of sonar data, wherein the system comprises:
   one or more sonar transducer assemblies configured to provide sonar data;
   one or more processors;
   a memory including computer program code configured to, when executed, cause the one or more processors to:
   receive the sonar data, wherein the sonar data provides information representative of an underwater environment around a watercraft; and
   perform adaptive contrast image processing to form adjusted sonar data, wherein the adaptive contrast image processing adjusts a brightness level or color of the sonar data at one or more locations while keeping the sonar data at the one or more locations, wherein the adaptive contrast image processing considers at least one of a distance of a location from a sonar transducer assembly of the one or more sonar transducer assemblies, a brightness level or color associated with the location, water clarity associated with a location, a depth at the location, a type of object positioned at the location, or an orientation of the object, wherein the adaptive contrast image processing does not consider strength of a sonar return for the sonar data.

2. The system of claim 1, wherein adaptive contrast image processing is performed on the sonar data before any sonar image is formed.

3. The system of claim 1, wherein the computer program code is further configured to, when executed, cause the one or more processors to:
   form a sonar image based on the sonar data,
   wherein adaptive contrast image processing is performed on sonar image data of the sonar image.

4. The system of claim 3, wherein the computer program code is further configured to, when executed, cause the one or more processors to:
   cause display of the sonar image.

5. The system of claim 3, wherein the sonar image is a sidescan image.

6. The system of claim 3, wherein the sonar data is only capable of generating a potential sonar image in black and white, and wherein the adjusted sonar data causes the sonar image to be in color.

7. The system of claim 1, wherein the adaptive contrast image processing is performed using at least one of contrast stretching, histogram equalization, or fuzzy logic.

8. A non-transitory computer readable medium having stored thereon software instructions that, when executed by a processor, cause the processor to enhance sonar data by executing operations comprising:
   receiving the sonar data, wherein the sonar data provides information representative of an underwater environment around a watercraft; and
   performing adaptive contrast image processing to form an adjusted sonar data, wherein the adaptive contrast image processing adjusts a brightness level or color of the sonar data at one or more locations while keeping the sonar data at the one or more locations, wherein the adaptive contrast image processing considers at least one of a distance of a location from a sonar transducer assembly of the one or more sonar transducer assemblies, a brightness level or color associated with the location, water clarity associated with a location, a depth at the location, a type of object positioned at the location, or an orientation of the object, wherein the adaptive contrast image processing does not consider strength of a sonar return for the sonar data.

9. The non-transitory computer readable medium of claim 8, wherein adaptive contrast image processing is performed on the sonar data before any sonar image is formed.

10. The non-transitory computer readable medium of claim 8, wherein, when executed by a processor, the software instructions cause the processor to enhance sonar data by executing additional operations comprising:
   forming a sonar image based on the sonar data,
   wherein adaptive contrast image processing is performed on sonar image data of the sonar image.

11. The non-transitory computer readable medium of claim 8, wherein, when executed by a processor, the software instructions cause the processor to enhance sonar data by executing additional operations comprising:
   causing display of the sonar image.

12. The non-transitory computer readable medium of claim 8, wherein the sonar image is a sidescan image.

13. The non-transitory computer readable medium of claim 8, wherein the sonar data is only capable of generating a potential sonar image in black and white, and wherein the adjusted sonar data causes the sonar image to be in color.

14. The non-transitory computer readable medium of claim 8, wherein the adaptive contrast image processing is performed using at least one of contrast stretching, histogram equalization, or fuzzy logic.

15. A method for the enhancement of sonar data, the method comprising:
   receiving the sonar data, wherein the sonar data provides information representative of an underwater environment around a watercraft; and
   performing adaptive contrast image processing to form an adjusted sonar data, wherein the adaptive contrast image processing adjusts a brightness level or color of the sonar data at one or more locations while keeping the sonar data at the one or more locations, wherein the adaptive contrast image processing considers at least one of a distance of a location from a sonar transducer assembly of the one or more sonar transducer assemblies, a brightness level or color associated with the location, water clarity associated with a location, a depth at the location, a type of object positioned at the location, or an orientation of the object, wherein the adaptive contrast image processing does not consider strength of a sonar return for the sonar data.

16. The method of claim 15, wherein adaptive contrast image processing is performed on the sonar data before any sonar image is formed.

17. The method of claim 15, further comprising:
forming a sonar image based on the sonar data,
wherein adaptive contrast image processing is performed on sonar image data of the sonar image.

18. The method of claim 17, further comprising:
causing display of the sonar image.

19. The method of claim 17, wherein the sonar data is only capable of generating a potential sonar image in black and white, and wherein the adjusted sonar data causes the sonar image to be in color.

20. The method of claim 15, wherein the adaptive contrast image processing is performed using at least one of contrast stretching, histogram equalization, or fuzzy logic.

* * * * *